(12) United States Patent
Sangaraju et al.

(10) Patent No.: US 12,404,830 B1
(45) Date of Patent: Sep. 2, 2025

(54) RENEWABLE HYBRID TURBINE SYSTEM WITH PIEZOELECTRIC AND SOLAR INTEGRATION

(71) Applicant: United Arab Emirates University, Al Ain (AE)

(72) Inventors: Sambasivam Sangaraju, Al Ain (AE); Mohsen Sherif, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/794,246

(22) Filed: Aug. 5, 2024

(51) Int. Cl.
    *F03B 13/00* (2006.01)
    *F03B 17/06* (2006.01)
    (Continued)

(52) U.S. Cl.
    CPC .............. *F03B 13/00* (2013.01); *F03B 17/06* (2013.01); *H01G 9/2022* (2013.01);
    (Continued)

(58) Field of Classification Search
    CPC ....... F03B 13/00; F03B 17/06; H01G 9/2022; H01G 9/2031; H01G 9/2059;
    (Continued)

(56) References Cited

U.S. PATENT DOCUMENTS

| | | | | |
|---|---|---|---|---|
| 4,241,283 A | * | 12/1980 | Storer, Sr. ................. | E02B 9/04 290/43 |
| 4,511,808 A | * | 4/1985 | Jost .......................... | F03B 13/06 417/334 |

(Continued)

FOREIGN PATENT DOCUMENTS

| | | | | |
|---|---|---|---|---|
| BG | 113542 A | * | 12/2023 | ............... G01L 1/16 |
| CA | 2990454 A1 | * | 3/2018 | ............... G21H 1/02 |

(Continued)

OTHER PUBLICATIONS

Piezoelectric Nanogenerators—A Review of Nanostructured Piezoelectric Energy Harvesters (Year: 2015).*

(Continued)

*Primary Examiner* — Pedro J Cuevas
(74) *Attorney, Agent, or Firm* — MH2 Technology Law Group, LLP

(57) ABSTRACT

There is disclosed a hybrid system for generating free energy from dam-water by integrating giant turbines with piezoelectric nanogenerators and solar cells. This three-in-one generator harnesses electrical energy from solar and mechanical energy. Strategically positioned large-scale turbines convert the kinetic energy of water flow into electrical energy. Concurrently, integrated piezoelectric nanogenerators transform mechanical stress from turbine operations into electrical energy via the piezoelectric effect. These nanogenerators function as self-charging hybrid supercapacitors (SCHSCs), featuring activated carbon (AC) electrodes and PVA-KOH-BTO electrolyte. Solar panels utilizing dye-sensitized solar cells (DSSCs) with $TiO_2$ photoanodes, molybdenum disulfide ($MoS_2$) counter electrodes, an iodine-based electrolyte, and dyes enhance energy conversion efficiency under varying solar conditions. The system efficiently generates electricity even under low-flow conditions, minimal sunlight, or when turbines are not operating at full capacity.

20 Claims, 6 Drawing Sheets

(51) Int. Cl.
*H01G 9/20* (2006.01)
*H02K 7/18* (2006.01)
*H02N 2/18* (2006.01)
*H02S 10/10* (2014.01)

(52) U.S. Cl.
CPC ......... *H01G 9/2031* (2013.01); *H01G 9/2059* (2013.01); *H02K 7/1823* (2013.01); *H02N 2/186* (2013.01); *H02S 10/10* (2014.12); *F05B 2220/708* (2013.01); *F05B 2220/709* (2013.01)

(58) Field of Classification Search
CPC ...... H02K 7/1823; H02N 2/186; H02S 10/10; F05B 2220/70; F05B 2220/709
See application file for complete search history.

(56) References Cited

U.S. PATENT DOCUMENTS

| | | | | |
|---|---|---|---|---|
| 4,717,831 A * | 1/1988 | Kikuchi | ................ | F03B 13/22 290/53 |
| 5,420,463 A * | 5/1995 | Agostino | ............. | F03B 17/005 290/53 |
| 5,882,143 A * | 3/1999 | Williams, Jr. | ........ | F03B 17/062 405/75 |
| 6,954,006 B2 * | 10/2005 | Williams, Jr. | ........ | F03B 17/062 290/43 |
| 7,262,517 B1 * | 8/2007 | Srybnik | .................... | E02B 9/04 290/43 |
| 7,267,300 B2 * | 9/2007 | Heath | ................... | B64D 35/04 244/12.3 |
| 7,375,437 B2 * | 5/2008 | Peckham | ............. | F03B 17/063 290/43 |
| 7,388,302 B1 * | 6/2008 | Srybnik | .................... | E02B 9/04 290/43 |
| 7,456,514 B2 * | 11/2008 | Ahmad | ................ | F03B 17/063 290/54 |
| 7,560,856 B2 * | 7/2009 | Chen | .................. | E21B 41/0085 310/800 |
| 7,564,144 B1 * | 7/2009 | Srybnik | ................. | F03B 13/10 290/43 |
| 7,572,524 B2 * | 8/2009 | Sabol | ...................... | F01D 17/02 427/446 |
| 7,602,076 B1 * | 10/2009 | Sipp | ..................... | F03B 17/063 290/43 |
| 7,994,649 B2 * | 8/2011 | Abatemarco | ........... | F03B 13/10 290/43 |
| 8,008,796 B2 * | 8/2011 | Muchow | ................ | E03B 11/12 290/43 |
| 8,026,625 B2 * | 9/2011 | Jones | ..................... | F03B 13/06 290/43 |
| 8,102,072 B2 * | 1/2012 | Tsou | ........................ | F03D 5/00 290/55 |
| 8,181,391 B1 * | 5/2012 | Giacomantonio | ..... | A01G 31/02 47/62 A |
| 8,186,950 B2 * | 5/2012 | Benito | .................... | F03D 80/40 416/61 |
| 8,246,303 B2 * | 8/2012 | Thomas | ................. | F01D 5/148 416/23 |
| 8,258,644 B2 * | 9/2012 | Kaplan | ................. | F03B 13/182 290/54 |
| 8,382,425 B2 * | 2/2013 | Griffin | ..................... | F03B 7/00 415/906 |
| 8,405,242 B2 * | 3/2013 | Borden | .................... | F03D 9/32 290/55 |
| 8,456,063 B2 * | 6/2013 | Jager | ..................... | H02N 2/183 310/339 |
| 8,519,554 B2 * | 8/2013 | Kaplan | ................. | F03G 7/08 290/1 R |
| 8,664,795 B2 * | 3/2014 | Borden | .................... | H01M 8/0656 290/55 |
| 8,721,282 B2 * | 5/2014 | Thomas | ................. | B64C 11/20 416/23 |
| 8,766,469 B2 * | 7/2014 | Payre | ..................... | F03D 9/008 290/43 |
| 8,878,381 B2 * | 11/2014 | Henry | .................... | F03D 9/008 290/53 |
| 9,045,209 B2 * | 6/2015 | Zeren | ........................ | F04F 5/00 |
| 9,194,360 B2 * | 11/2015 | Payre | .................... | F03B 13/06 |
| 9,366,234 B2 * | 6/2016 | Sanchez | ................ | F03D 9/10 |
| 9,534,579 B2 * | 1/2017 | Van Rompay | ........ | F03B 17/063 |
| 9,553,452 B2 * | 1/2017 | Gillett | ...................... | H02J 3/30 |
| 10,094,361 B2 * | 10/2018 | Bardia | .................. | H02K 7/183 |
| 10,148,090 B2 * | 12/2018 | Gillett | ...................... | H02J 3/30 |
| 10,280,893 B2 * | 5/2019 | Jessamy | ................ | F03B 13/086 |
| 10,526,056 B1 * | 1/2020 | Hakki | ..................... | F03D 1/025 |
| 10,648,449 B2 * | 5/2020 | Kawai | ................... | F03B 17/063 |
| 10,742,039 B2 * | 8/2020 | Byrnes | ................. | F03B 13/142 |
| 10,840,735 B2 * | 11/2020 | Cooper | .................... | H02J 3/32 |
| 10,879,727 B1 * | 12/2020 | Cooper | ................. | H02J 3/007 |
| 10,892,618 B1 * | 1/2021 | Cooper | ............... | H04L 12/2816 |
| 10,975,832 B2 * | 4/2021 | Gehring | .............. | F03B 17/063 |
| 11,302,490 B2 * | 4/2022 | Risovanyy | ............. | G21H 1/02 |
| 11,319,920 B2 * | 5/2022 | Blodgett | ............... | H02K 7/1823 |
| 11,371,433 B2 * | 6/2022 | Saripella | .................. | B32B 5/12 |
| 11,434,866 B2 * | 9/2022 | Gehring | ................ | F03B 13/268 |
| 11,592,004 B2 * | 2/2023 | Karasawa | ............. | F03B 17/061 |
| 11,719,219 B2 * | 8/2023 | Bonutti | ............... | F03B 13/1855 290/54 |
| 11,749,466 B1 * | 9/2023 | Hassan | ................. | H01G 9/2031 136/254 |
| 11,835,025 B2 * | 12/2023 | Blodgett | .............. | F03B 17/065 |
| 11,862,396 B1 * | 1/2024 | Hassan | .................. | H01G 11/84 |
| 11,888,443 B2 * | 1/2024 | Yoo | ........................ | H10K 85/50 |
| 11,967,857 B1 * | 4/2024 | Cooper | ................... | H02J 9/00 |
| 12,047,029 B2 * | 7/2024 | Anderson | ................. | F03D 9/11 |
| 12,228,105 B2 * | 2/2025 | Farb | ................... | H02S 20/20 |
| 12,305,610 B2 * | 5/2025 | Farb | ........................ | H02S 10/12 |
| 12,326,133 B2 * | 6/2025 | Bonutti | ................. | F03B 13/148 |
| 2005/0287386 A1 * | 12/2005 | Sabol | ................. | F01D 17/02 73/776 |
| 2006/0049302 A1 * | 3/2006 | Kennedy | ................. | B64C 27/72 244/17.11 |
| 2006/0192046 A1 * | 8/2006 | Heath | ................... | B64D 35/04 244/12.3 |
| 2009/0160192 A1 * | 6/2009 | Chen | .................. | F03B 17/005 290/54 |
| 2009/0267347 A1 * | 10/2009 | Abatemarco | ........... | F03B 13/10 290/43 |
| 2010/0039062 A1 * | 2/2010 | Gu | ........................ | B60L 55/00 320/109 |
| 2010/0072859 A1 * | 3/2010 | Jager | ......................... | H02N 2/183 310/339 |
| 2010/0158688 A1 * | 6/2010 | Benito | .................... | F03D 80/40 416/61 |
| 2010/0164231 A1 * | 7/2010 | Tsou | ...................... | H02N 2/185 290/55 |
| 2010/0259044 A1 * | 10/2010 | Muchow | ................ | E03B 11/12 137/565.17 |
| 2011/0064579 A1 * | 3/2011 | Thomas | .................... | B64C 3/52 416/146 R |
| 2011/0084489 A1 * | 4/2011 | Kaplan | ................... | F03B 17/06 290/54 |
| 2011/0084493 A1 * | 4/2011 | Kaplan | ................... | F03B 17/06 290/55 |
| 2012/0080071 A1 * | 4/2012 | Kimbriel | ................ | F24S 25/10 136/246 |
| 2012/0134823 A1 * | 5/2012 | Tully | ..................... | F03D 1/0633 416/131 |
| 2013/0009469 A1 * | 1/2013 | Gillett | .................... | H02J 3/381 307/25 |
| 2013/0064666 A1 * | 3/2013 | Thomas | .................. | F01D 5/148 416/158 |
| 2014/0261132 A1 * | 9/2014 | Zeren | ..................... | F17C 9/04 417/151 |
| 2014/0265598 A1 * | 9/2014 | Isabella | .................. | F03D 9/25 416/146 R |
| 2017/0012430 A1 * | 1/2017 | Gillett | .................... | H02J 3/381 |
| 2017/0096985 A1 * | 4/2017 | Bardia | .................. | H02K 7/183 |
| 2018/0355837 A1 * | 12/2018 | Bonutti | ..................... | F03D 1/06 |

(56) References Cited

U.S. PATENT DOCUMENTS

| | | | |
|---|---|---|---|
| 2018/0372073 A1* | 12/2018 | Al Tarabsheh | H02S 10/12 |
| 2019/0312435 A1* | 10/2019 | Weston | H02J 7/34 |
| 2020/0035421 A1* | 1/2020 | Risovanyy | H01G 11/30 |
| 2021/0062717 A1* | 3/2021 | Saripella | B29C 70/88 |
| 2023/0081734 A1* | 3/2023 | Prentice | H02S 20/32 |
| | | | 136/245 |
| 2023/0238917 A1* | 7/2023 | Yoo | H10K 85/50 |
| | | | 136/256 |
| 2024/0021379 A1* | 1/2024 | Hassan | H01G 11/62 |
| 2024/0110543 A1* | 4/2024 | Bernhammer | G01M 5/0016 |
| 2024/0125295 A1* | 4/2024 | Bonutti | F03D 1/06 |
| 2024/0157055 A1* | 5/2024 | Lee | G16H 50/30 |
| 2024/0247967 A1* | 7/2024 | Klicpera | G01F 25/10 |
| 2024/0337237 A1* | 10/2024 | Farb | H02J 7/0042 |
| 2024/0337252 A1* | 10/2024 | Farb | F03D 9/25 |
| 2024/0339952 A1* | 10/2024 | Farb | H04N 7/18 |

FOREIGN PATENT DOCUMENTS

| | | | | |
|---|---|---|---|---|
| CN | 104517735 A | * | 4/2015 | |
| CN | 105932307 A | * | 9/2016 | |
| CN | 105932307 B | * | 6/2018 | |
| CN | 107887173 B | * | 6/2020 | |
| EP | 4369350 A1 | * | 5/2024 | A61M 5/1723 |
| KR | 101567693 B1 | * | 11/2015 | H01G 11/86 |
| KR | 20190042416 A | * | 4/2019 | H01G 11/82 |
| KR | 102320946 B1 | * | 11/2021 | H01G 11/32 |
| RU | 2668533 C1 | * | 10/2018 | G21H 1/02 |
| RU | 191378 U1 | * | 8/2019 | H01G 11/32 |
| RU | 195154 U1 | * | 1/2020 | G21H 1/02 |
| WO | WO-2014146501 A1 | * | 9/2014 | H01G 11/08 |
| WO | WO-2014167063 A1 | * | 10/2014 | A61N 1/3785 |
| WO | WO-2018044192 A1 | * | 3/2018 | G21H 1/02 |

OTHER PUBLICATIONS

Piezoelectric Nanogenerators for Personalized Healthcare (Year: 2022).*

Recent Progress in Piezoelectric-Triboelectric Effects Coupled Nanogenerators (Year: 2023).*

* cited by examiner

RENEWABLE HYBRID TURBINE SYSTEM WITH PIEZOELECTRIC AND SOLAR INTEGRATION

FIELD OF THE INVENTION

The present invention relates to the field of renewable energy generation, and more particularly to a hybrid system integrating piezoelectric nanogenerators and solar cells with hydropower turbines for efficient electricity generation under variable conditions.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Hydroelectric power plants have traditionally been a reliable source of energy, requiring significant investments in turbines and generating equipment. Although their maintenance costs are relatively low compared to other power generation methods, these plants rely on a continuous water supply. Many existing hydroelectric power plants, particularly those providing base load power, are over 30 years old, necessitating modernization and upgrades to maintain efficiency and reliability.

Historically, coal has been the most abundant and affordable fuel source for electricity generation. However, recent decades have seen a significant increase in the construction of natural gas-fired generators. Despite this, the push towards sustainable energy solutions has never been stronger. Renewable energy, derived from natural resources replenished on a human timescale such as sunlight, wind, rain, tides, waves, and geothermal heat. Unlike other energy sources that are concentrated in specific regions, renewable energy sources are widely distributed geographically and are environmental friendly alternative to fossil fuels. Researchers are actively exploring alternative energy sources, while engineers are designing various models for power generation that prioritize green and renewable energy. Over the past decade, there has been a decline in traditional energy resources due to technological advancements and the adoption of modern equipment in electrical power generation.

Recent innovations in energy harvesting technologies highlight the ongoing efforts to enhance the efficiency and sustainability of power generation systems. For instance, a related prior art in the field developed a soft-contact cylindrical triboelectric nanogenerator with an electromagnetic generator featuring a swing structure for low frequency hydro energy harvesting. To enhance performance and durability, the design incorporates brushes made from flexible rabbit hairs, which aid in charge pumping onto the dielectric surface to reduce operational resistance. By harnessing the swing motion of the rotor, the hybrid nanogenerator can generate over 60 current pulses within 15 seconds from either module with a single external trigger. Optimal performance is achieved at a water wave agitation frequency of 0.1 Hz, resulting in a peak power density of 10.16 W m$^{-3}$ and an average power density of 0.23 W m$^{-3}$.

Similarly, research into the prior art shows a multifunctional power unit developed by hybridizing the contact-separate triboelectric nanogenerator, electromagnetic generator, and solar cells for harvesting blue energy. The design proposes three modes for harvesting blue energy: i) contact-separate mode triboelectric nanogenerators (CS-TENGs), ii) freestanding sliding mode electromagnetic generators (FS-EMGs), and iii) commercial water-proof silicon-based solar cells (WS-SCs). Activated by mechanical energy from waves, the four TENGs yield a $V_{oc}$ of 142 V and an $I_{sc}$ of around 23.3 µA at a frequency of 2 Hz. Consequently, the $V_{oc}$ of the four EMGs can attain approximately 0.66 V, with an $I_{sc}$ of approximately 2.14 mA.

Despite recent technological advancements, significant limitations and challenges persist with existing energy technologies. Hydroelectric turbines, for instance, are highly dependent on the specific characteristics of their installation water bodies, such as flow rate, pressure, and consistency. These turbines are less effective in low-flow conditions and are suitable only for certain geographical locations with specific hydrological features. Similarly, the integration of solar cells for power generation is heavily influenced by weather conditions, requiring frequent maintenance to ensure optimal performance. The intermittent nature of solar energy also contributes to grid instability, posing challenges for maintaining consistent power supply.

Furthermore, there is a heavy global dependency on fossil fuels for energy generation, which not only contributes to greenhouse gas emissions but also has significant environmental impacts. The construction of dams, often necessary for hydroelectric projects, can disrupt aquatic habitats and alter local ecosystems, further exacerbating environmental concerns. Moreover, the upfront costs associated with designing, manufacturing, and installing new energy harvesting systems can be prohibitively high, particularly in regions with limited financial resources. This financial barrier impedes widespread adoption of renewable energy technologies, despite their potential long-term benefits.

To address these challenges, there is a pressing need to maximize energy efficiency and leverage existing infrastructure to develop cost-effective solutions for a more resilient, efficient, and sustainable energy future. By fostering technological innovation and driving advancements in renewable energy, these efforts aim to overcome current limitations of existing technologies and pave the way for economic growth and investment in green technologies.

Based on the above explained, there exists a need for a better system for producing clean, sustainable, and free energy with good efficiency and consistency harnessing renewable resources and under variable conditions.

SUMMARY OF THE INVENTION

Therefore it is an object of the present invention to propose a hybrid system and a method, integrating piezoelectric nanogenerators and solar cells with hydropower turbines for efficient and consistent electricity generation under variable conditions.

There is disclosed a hybrid system for efficient free-energy generation from multiple renewable sources, comprising: a giant turbine, positioned strategically within a water flow, configured to convert kinetic energy from the water flow into electrical energy; a plurality of piezoelectric nanogenerators integrated with the turbine, configured to convert mechanical energy from the water flow into electrical energy; and a plurality of solar cells integrated with the turbine, configured to convert solar energy into electrical energy, wherein the system combines and regulates electrical outputs from the turbine, the piezoelectric nanogenerators and the solar cells synergistically to provide a continuous and unified electrical output, regardless of real-time environmental conditions.

In an embodiment of the present invention, the turbine comprises stator and rotor components, with a shaft and rotatory blades designed to maximize the conversion of kinetic energy from the water flow into electrical energy.

In an embodiment of the present invention, the turbine is positioned strategically in the water flow having a flow velocity to induce torque to rotate the turbine blades.

In another embodiment of the present invention, the piezoelectric nanogenerators are strategically integrated within or around the turbine structure to capture mechanical energy from water flow.

According to the disclosure, the piezoelectric nanogenerators convert mechanical stress and vibrations of the turbine due to flow of water into electrical energy via piezoelectric effect.

In an embodiment of the present invention, the piezoelectric nanogenerators are self-charging hybrid supercapacitors (SCHSC) comprising a cathode and an anode both made of activated carbon (AC), and a PVA-KOH-BaTiO$_3$ (PVA-KOH-BTO) piezoelectrolyte.

In another embodiment of the present invention, the solar cells are dye-sensitized solar cells (DSSCs) comprising TiO$_2$ as a photoanode, a transition metal dichalcogenides (TMD) as a counter electrode, an iodine-based electrolyte and a dye comprising N719, for an enhanced performance and energy conversion efficiency, via a photo-electrochemical process.

In an embodiment of the present invention, mesoporous TiO$_2$ as the photoanode exhibits high quantum efficiency, converting light into electrons with help of an iodine-based dye.

In an embodiment of the present invention, the TMD is a molybdenum disulfide (MoS$_2$) as a counter electrode, facilitating effective charge separation and rapid electron transfer across electrode/electrolyte interfaces.

In another embodiment of the present invention, the solar cells are positioned strategically on a surface of the turbine to maximize sunlight exposure without interfering with the turbine operation.

In an embodiment of the present invention, the system is configured to generate electricity efficiently and optimize the energy output based on the real-time environmental conditions comprising low flow conditions, minimum sunlight or the turbine is not operating at full capacity.

According to the present invention, the piezoelectric nanogenerators are designed to operate independently of the turbine rotation, capturing energy during low flow conditions.

In an embodiment of the present invention, the system leverages existing infrastructure by integrating it with the piezoelectric nanogenerators and the solar cells, thereby reducing need for new installations and causing minimal ecological disruption.

There is disclosed a hybrid method for efficient free-energy generation from multiple renewable sources, comprising: positioning a giant turbine within a water flow to convert kinetic energy from the water flow into electrical energy; integrating a plurality of piezoelectric nanogenerators with the turbine, wherein the piezoelectric nanogenerators convert mechanical energy transferred from the water flow to the turbine, to electrical energy via piezoelectric effect; integrating a plurality of solar cells with the turbine, wherein the solar cells convert solar energy into electrical energy via a photo-chemical process; combining and regulating synergistically electrical outputs from the turbine, the piezoelectric nanogenerators and the solar cells to provide a continuous and unified electrical output, regardless of real-time environmental conditions.

In an embodiment of the present invention, the method further comprises integrating the piezoelectric nanogenerators strategically within or around the turbine structure wherein, the piezoelectric nanogenerators are self-charging hybrid supercapacitors (SCHSC) comprising a cathode and an anode both made of activated carbon (AC), and a PVA-KOH-BaTiO$_3$ (PVA-KOH-BTO) piezo-electrolyte.

In another embodiment of the present invention, the method further comprises positioning the solar cells strategically on a surface of the turbine to maximize sunlight exposure without disrupting the turbine operation wherein, the solar cells are dye-sensitized solar cells (DSSCs) comprising TiO$_2$ as a photoanode, a transition metal dichalcogenides (TMD) as a counter electrode, an iodine-based electrolyte and a dye comprising N719.

In an embodiment of the present invention, mesoporous TiO$_2$ as the photoanode exhibits high quantum efficiency, converting light into electrons with help of an iodine-based dye and the TMD is a molybdenum disulfide (MoS$_2$) as a counter electrode, facilitating effective charge separation and rapid electron transfer across electrode/electrolyte interfaces in the method.

According to the present invention, the method generates electricity efficiently and optimizes dynamically the energy output based on the real-time environmental conditions comprising low flow conditions, minimum sunlight or the turbine is not operating at full capacity.

In another embodiment of the present invention, the method further comprises operating the piezoelectric nanogenerators independently of the turbine rotation to capture energy during low flow conditions.

In an embodiment of the present invention, the method leverages existing infrastructure by integrating it with the piezoelectric nanogenerators and the solar cells, thereby reducing need for new installations and causing minimal ecological disruption.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
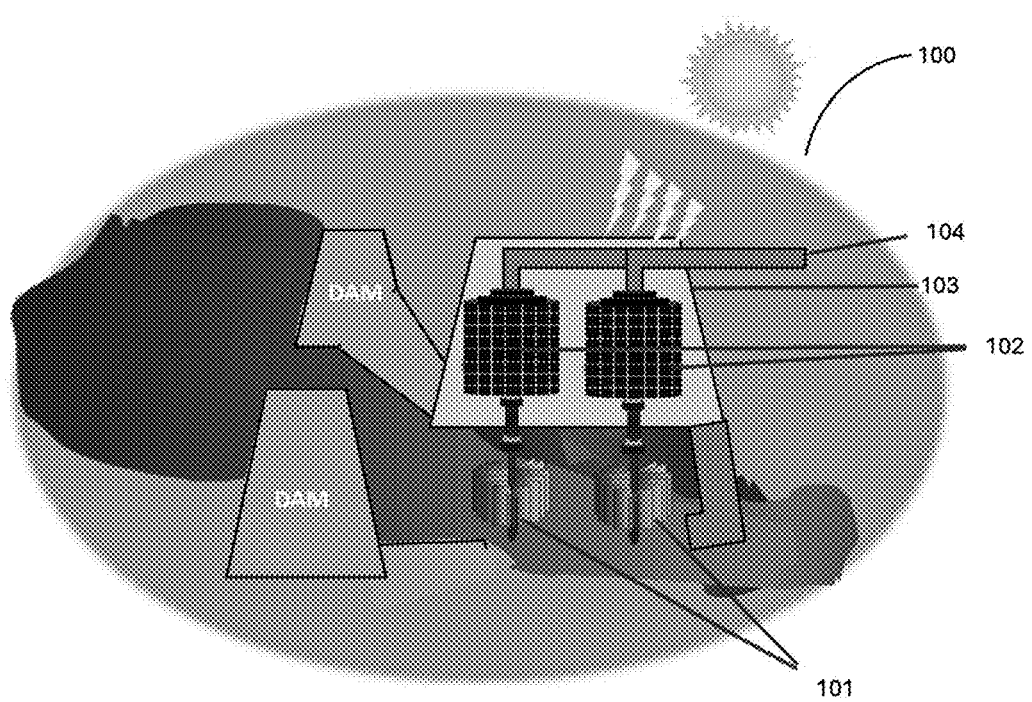
FIG. 1 shows the schematic diagram of giant turbine integrated with piezoelectric nanogenerator and solar cells, in accordance with the present invention.

The aspects of the proposed renewable hybrid turbine system with piezoelectric and solar integration-according to the present invention will be described in conjunction with FIGS. 1-6. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention proposes system for generating free energy from dam water, utilizing giant turbines which are integrated with piezoelectric nanogenerators and solar cells. The proposed system harnesses the potential of dam water to generate free energy by combining giant turbines with piezoelectric nanogenerators and solar cells, wherein electrical energy is generated through changes in elastic force, electromagnetic fields, and polarization energy. The integrated turbines convert mechanical energy into electrical energy, with the dam water serving as the driving force that induces the torque to rotate the giant turbine blades, in accordance with Faraday's Law. Simultaneously, the pressure exerted by the dam water on the piezoelectric nanogenerators induces the piezoelectric effect, generating additional electrical energy. Furthermore, solar cells mounted on top of the generator convert the sunlight illuminating on their surface into electrical energy. Collectively, the giant turbines, integrated with piezoelectric nanogenerators, and solar cells form a comprehensive three-in-one generator system that efficiently produces clean, sustainable, and free energy with good efficiency. The term 'giant' in the context of the present invention, refers to giant turbines known for their impressive scale, boasting rotor diameters of up to 220 meters (721 feet) and towering heights that exceed 180 meters (590 feet). This enormous size allows them to capture wind energy more effectively, maximizing the power output.

The system features large-scale giant turbines strategically positioned in rivers or streams with strong water currents. These turbines are designed to efficiently capture and convert the kinetic energy of flowing water into mechanical energy. As water flows through the giant turbines, it generates mechanical energy which drives the turbines to produce electricity.

In one embodiment of the system, piezoelectric integration is incorporated into it. Piezoelectric materials possess the unique property of generating an electric charge when subjected to mechanical stress or vibration. In this system, as water flows past the turbines, it exerts pressure and induces vibrations within the turbine structure, thereby activating the piezoelectric elements and generating electricity. The integration of piezoelectric nanogenerators with giant turbines in hydropower generation aims to enhance the overall energy harvesting efficiency. When water flows through the giant turbines, it generates mechanical energy that drives the turbines to produce electricity. Piezoelectric nanogenerators can be strategically placed within or around the turbines to capture additional mechanical energy from the flowing water and convert it into electrical energy. This integration can be achieved by embedding or attaching piezoelectric nanogenerators to the surfaces of the turbine blades or in the surrounding infrastructure, such as the housing or the dam. As water flows through the turbines, it causes mechanical vibrations, which in turn induce mechanical stress on the piezoelectric materials and generate as a result, electric charges.

The electricity generated from the piezoelectric nanogenerators complements the power output of the turbines, thereby increasing the overall energy efficiency of the hydropower system. Additionally, since piezoelectric nanogenerators can operate independently of turbine rotation, they can capture energy even during low flow conditions when the turbines are not operating at full capacity. This integration maximizes the utilization of water resources for power generation, making hydropower more sustainable and reliable. Furthermore, it offers the potential for hybrid energy harvesting systems that combine multiple renewable energy technologies to optimize energy production.

In a further embodiment of the invention, the system incorporates solar cell integration. The integration of solar photovoltaic (PV) cells with giant turbines in hydropower generation presents an efficient approach to harnessing renewable energy sources synergistically. Combining the steady power generation of hydropower with solar cells enhances overall free energy production from two different renewable resources; water and sunlight. The proposed embodiment of the invention focuses on integrating solar cells with giant turbines, a concept that gains significant attention due to the capability to produce continuous energy through the conversion of solar energy via the photoelectric effect and hydropower generation. Among various solar cell types, the present embodiment of the invention uses dye-sensitized solar cells (DSSCs), that have emerged as highly promising candidates for efficiently converting light into electricity through photo-electrochemical processes. Efforts to enhance efficiency have focused on optimizing cell morphology to minimize ion transport distance and adjusting or fine-tuning material bandgaps.

In another embodiment of the invention, solar cells employ titanium dioxide ($TiO_2$) as a photoanode material in DSSCs. Notably, DSSCs utilizing $TiO_2$, are characterized by a large surface area, strong oxidation power and wide band gap (3.2 eV), and they serve as excellent photo-anodes, exhibiting high quantum efficiency (~80%). $TiO_2$'s high surface area allows for a greater amount of dye adsorption, which is crucial for capturing more sunlight and converting it into electricity. Its wide band gap makes it stable under solar irradiation, which is essential for the longevity and efficiency of solar cells. Complementarily, counter electrodes employ transition metal dichalcogenides (TMDs) in an embodiment of the system. TMDs as counter electrodes, facilitate effective charge separation and rapid electron transfer across the electrode/electrolyte interfaces, thereby enhancing the overall efficiency of the solar cell. Molybdenum disulfide ($MoS_2$) is a transition metal dichalcogenide (TMD) that has unique electronic, optical, and mechanical properties, making it an excellent a counter electrode in dye-sensitized solar cells (DSSCs), in a further embodiment of the system. The choice of electrolytes is also pivotal, with those demonstrating good thermal stability, non-toxicity, and non-flammability being preferred. In an embodiment of the system, iodide (I-) and tri-iodide ($I_3^-$) based electrolytes are adopted for their redox activity in DSSCs.

PVA-KOH-$BaTiO_3$ or PVA-KOH-BTO is a composite material used in piezoelectric nanogenerators and supercapacitors. In another embodiment of the proposed invention, the system details the integration of a piezoelectric nanogenerator supercapacitor as a mechanical energy harvesting device, utilizing activated carbon (AC) as both the cathode and anode, and a PVA-KOH-$BaTiO_3$ piezoelectrolyte. The piezoelectric nanogenerator is integrated on the giant turbine blades to generate electricity from both the hydro energy and mechanical energy. Additionally, in a preferred embodiments of the system, the solar cells employ $TiO_2$ as the photoanode, $MoS_2$ as the counter electrode, iodine as the electrolyte, and N719 dyes to harvest solar energy and efficiently convert it into electricity. Further, solar cells are coated on the surface of the giant turbine generator.

The proposed system further involves the process of electricity generation by harnessing hydroelectric power, the piezoelectric effect, and solar power. The mechanical stress and vibrations induced by the flowing water cause the piezoelectric materials within the turbine structure to deform slightly, thereby generating an electric charge. This electric charge is then harvested and converted into usable electricity through a system of conductors and transformers integrated into the turbine. Similarly, the illumination of light on the solar panels incorporated into the system effectively convert sunlight into electricity, further enhancing the overall energy output.

By integrating traditional hydroelectric turbine technology with piezoelectric materials and solar panels, the system offers several notable advantages. It can operate efficiently even in low-flow environments where conventional turbines might struggle, thereby expanding the potential for hydropower generation to a broader range of locations. Furthermore, the scalability of these turbines allows for customization based on the specific needs and characteristics of different water bodies, making the system adaptable and versatile. This combined approach enhances the efficiency, scalability and practicality of renewable energy generation. One of the significant advantages of the proposed piezoelectric and solar-integrated turbines is their minimal environmental impact. Unlike other forms of renewable energy, such as wind or conventional hydropower, this system does not rely on favorable weather conditions and can provide consistent energy generation. Additionally, the integration of piezoelectric materials reduces the ecological disruption typically associated with the construction of dams for traditional hydropower projects. This environmentally friendly approach makes the system a sustainable and reliable solution for clean energy production.

The integrated giant turbines incorporating piezoelectric nanogenerators and solar cells exhibit numerous notable features, outlined as follows. 1) Integration of Renewable Energy Sources: First of all, the invention combines giant turbines, piezoelectric nanogenerators, and solar cells into a unified three-in-one energy generator. This system harnesses electrical energy from dual renewable sources-solar energy and mechanical energy. 2) Efficient Giant Turbines: In an embodiment of the proposed system, large-scale giant turbines are designed for optimal efficiency and are strategically positioned to convert kinetic energy from water flow into electrical energy effectively. 3) Water Flow Activation: Water serves as a primary source for producing electrical energy by rotating the giant turbine blades based on their own flow velocity, which activates the torque on the giant turbines. 4) Piezoelectric Nanogenerators: In an embodiment of the present system, piezoelectric nanogenerators integrated within the turbines, convert mechanical stress and vibrations from turbine operations into electrical energy using the piezoelectric effect. The mechanical stress and vibrations of the turbine from the water flow activates piezoelectric materials by deforming them slightly and generates electric charge by polarization. The harvested charge is then converted into electricity using conductors and transformers integrated into the turbine structure. 5) Self-Charging Supercapacitor: In another embodiment of the proposed system, the piezoelectric nanogenerator functions as a self-charging hybrid supercapacitor (SCHSC). It features activated carbon (AC) for both cathode and anode, with a piezoelectric electrolyte composed of PVA-KOH-$BaTiO_3$ (PVA-KOH-BTO). This SCHSC is strategically integrated within or around the giant turbine structure or on the turbine blades.

6) Solar Panel Integration: In an embodiment of the invention, solar panels are strategically coated on the surface of the giant turbine generator, to convert solar energy into electricity via the photoelectric effect. This integration is without interfering with turbine operation and with minimal energy losses. 7) Dye-Sensitized Solar Cells (DSSCs): In one embodiment, the solar panels utilize dye-sensitized solar cells (DSSCs) with $TiO_2$ as a photoanode, transition metal dichalcogenides (TMDs) as a counter electrode, an iodine-based electrolyte and N719 dyes. Iodine-based electrolyte facilitates redox activity in DSSCs. This configuration enhances energy conversion efficiency and performance under varying solar conditions. 8) High Efficiency Components: In another embodiment, mesoporous $TiO_2$ as the photoanode exhibits high quantum efficiency, converting light into electrons with the help of iodine-based dye. In another embodiment, 2D $MoS_2$ as transition metal dichalcogenides (TMDs) for counter electrode, facilitates effective charge separation and rapid electron transfer across electrode/electrolyte interfaces. 9) Robust Energy Generation: The integrated system is capable of generating electricity efficiently even under low flow conditions, minimal sunlight or when the turbines are not operating at full capacity. 10) Modular and Scalable Design: The system's modular and scalable design allows for customization to fit specific energy needs and adapt to characteristics of different geographical locations. The system enables deployment in a variety of settings such as individually or as part of larger arrays. 11) Synergistic Energy Production: By combining piezoelectric nanogenerators and solar cells with turbines, the system maximizes energy production synergistically and leverages existing infrastructure, reducing the need for new installations. 12) Stability and Reliability: The system provides a stable and reliable power supply under variable conditions, thereby improving grid stability and causes minimal ecological disruption as well.

The significance of the invention lies in the integration of solar cells and piezoelectric nanogenerators with giant hydropower turbines. This innovative approach has the potential for practical implementation to generate clean energy in a sustainable and cost-effective manner. By harnessing multiple renewable energy sources simultaneously, this hybrid system aims to maximize energy efficiency. Solar cells convert sunlight into electricity, while piezoelectric nanogenerators capture and convert mechanical energy from vibrations into electrical energy. Integrating these technologies with hydropower turbines can significantly enhance the overall energy output by utilizing solar energy during daylight and mechanical vibrations generated by turbine operations. This method not only improves efficiency but also stabilizes energy production, providing a more reliable power supply by balancing the intermittent nature of solar power with the consistent output of hydropower.

The invention presented herein offers numerous benefits. Combining solar cells and piezoelectric nanogenerators with hydropower turbines significantly boosts overall energy production by harnessing solar power and mechanical vibrations, in addition to water flow. This approach ensures optimal resource utilization and enhances the hydropower plant's efficiency. Capturing mechanical energy through piezoelectric nanogenerators and solar energy during daylight, the system maximizes the use of available resources, further improving the plants's overall efficiency. Upgrading existing hydropower infrastructure with the proposed integrated system eliminates the need for separate installations, cutting down on both capital and operational expenses. This integration minimizes fossil fuel usage and reduces environmental impact by optimizing renewable energy generation and decreasing the need for additional land use. Hybrid energy systems provide a more stable and reliable power supply by balancing the variable nature of solar energy with the consistent output of hydropower. Excess energy generated can be stored for use during peak demand or periods of low generation, enhancing energy availability and reliability. Additionally, promoting the development and implementation of advanced renewable technologies fosters innovation, creates jobs, and drives economic growth in the green energy sector.

FIG. 1 illustrates the schematic diagram of giant turbine integrated with piezoelectric nanogenerator and solar cells (100), situated at a dam site operating downstream. The system comprises of a giant turbine coated with a piezoelectric nanogenerator (101), a solar cell-coated giant turbine generator (102) housed within a transparent shield (103), all connected to a power source (104).

Figure 2:
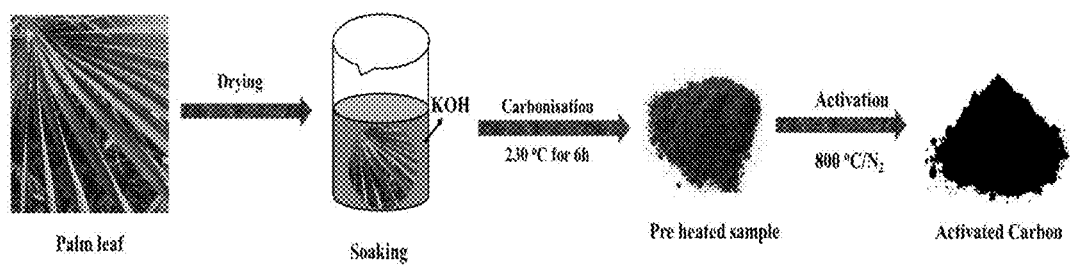
FIG. 2 shows the synthesis process of palm leaf derived activated carbon, according to the disclosure.

Various embodiments of the present invention involve experimental set ups and procedure carried out for the fabrication of the giant turbines integrated with piezoelectric nanogenerators. In one embodiment of the invention, activated carbon (AC) is synthesised as derived from palm leaves in an experimental procedure. FIG. 2 shows the synthesis process of palm leaf derived activated carbon. According to this, palm leaves are gathered, cleansed with de-ionized water, and sun-dried for a week. Subsequently, 10 grams of the dried leaves are sliced into small fragments and these fragments are then soaked or submerged in separate 1 M aqueous KOH solution for a couple of days. Following this, the fragments undergo carbonisation when dried at 230° C. for 6 hours to activate the carbon. The resulting pre-heated products are then subjected to annealing at 800° C. for 4 hours under nitrogen atmosphere (activation process). The final products undergo washing with hydrochloric acid until reaching a neutral pH of 7 and are dried overnight at 80° C., resulting in activated carbon (AC) as illustrated in the figure.

In another embodiment of the invention, an experimental set up is conducted to synthesize the PVA-KOH-BaTiO$_3$ piezoelectrolyte. To prepare the PVA-KOH-BaTiO$_3$ (PVA-KOH-BTO) piezoelectrolyte, 1 g of polyvinyl alcohol (PVA) and 0.25 g of KOH pellets are dissolved in 20 mL of distilled water under continuous stirring. The solution is then heated to 90° C. for 3 hours. After cooling, the viscous solution is mixed with 1 g of BaTiO$_3$ to obtain the desired piezoelectrolyte.

Figure 3:
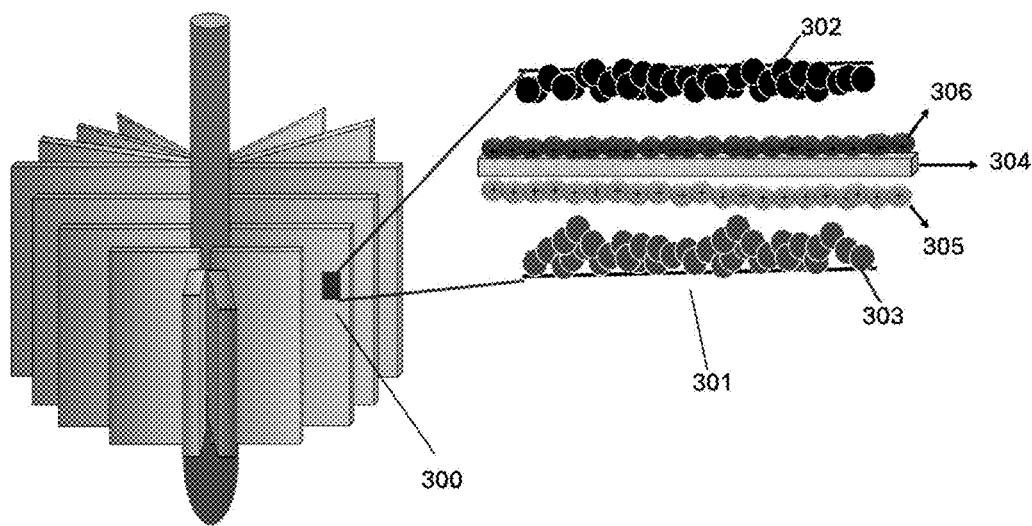
FIG. 3 shows the schematic representation of turbine blades coated with nanogenerator.

In an embodiment of the proposed system, self charging hybrid supercapacitor is experimentally fabricated. FIG. 3 is the schematic representation of turbine blade (300) coated with the synthesized piezoelectric nanogenerator supercapacitor. The self-charging hybrid supercapacitor (SCHSC) device (301) is constructed by sandwiching an activated carbon (AC) cathode (303) and an activated carbon anode (302), with porous cellulose filter paper used as the separator. To enable self-charging capability, a PVA-KOH-BTO piezoelectrolyte (304) is added between the cathode and anode, allowing it to solidify. The SCHSC is assembled by combining the AC-coated anode and cathode coated with PVA-KOH-BTO piezoelectrolyte and sealed with parafilm, and subsequently applied to turbine blades as depicted in FIG. 3. This arrangement leverages the piezoelectric properties of the PVA-KOH-BTO material, which generates electrical charge in response to mechanical stress. The activated carbon layers enhance the conductivity and stability of the piezoelectric layer. The generated cations K$^+$ (305) and anions OH$^-$ (306) indicate the ionization state of the electrolyte which enhances the ionic conductivity and overall electrochemical performance of the device, thereby optimizing its piezoelectric functionality.

Another embodiment of the system involves fabrication of giant turbines integrated with piezoelectric nanogenerators. Generally, the giant turbine consists of stator, rotor, shaft, and rotatory blades which are utilized to produce electricity. In present innovation, the giant turbine blades are integrated with the piezoelectric supercapacitor device that consists of AC cathode and anode, PVA-KOH gel as electrolyte, and whatman filter paper as separator.

In an embodiment of the invention, the piezoelectric charging mechanism and theoretical evidence of self-charging effect from integrated turbine blades with piezoelectric nanogenerators is investigated. The piezoelectric charging mechanism is analysed based on the electromagnetic theory. The self-charging/discharging process induced by the piezoelectric device on the turbine blades can be explained in detail through the electromagnetic theory. Without any water pressure, the piezoelectric device obeys the law of conservation of energy and the total energy in the piezoelectric device can be explained as, $$-\int\int\int \vec{P}\vec{v}dV = \hat{x}\int\int \vec{S}d\vec{\sigma} + \frac{d}{dt}\int\int\int E_d dV \qquad (1)$$

where, Ea indicates the energy density, S represents the density of the electromagnetic flux. When the water flows on the turbine, the pressure arouses due to the continuous flow of water which results in inducing the piezoelectric effect on the turbine blades. Due to the induced piezoelectric process, the PVA-KOH-BTO piezoelectric nanogenerator overcomes the elastic force and electromagnetic force. As a result, the PVA-KOH-BTO piezoelectric nanogenerator suffers with the variation in elastic potential energy and along with the polarization energy. This process can be expressed as, $$P_T - \hat{x}\int\int \vec{S}d\vec{\sigma} - \int\int\int \vec{H}\frac{\partial \vec{B}}{\partial t}dV = \int\int\int \vec{E}\frac{\partial \vec{D}}{\partial t}dV + \frac{dW_T}{dt} + \frac{dW_E}{dt} \qquad (2)$$

Here, '$P_T$' indicates the total power generated due to the water pressure at the specified time 't'

$$\frac{dW_E}{dt}$$

and $$\frac{dW_T}{dt}$$

represent the variation in the elastic potential energy and polarizing energy respectively.

$$\iiint \vec{H} \frac{\partial \vec{B}}{\partial t}$$

dV is the produced electric energy due to the magnetization process. Further, when the water flow stops, the piezoelectric device starts to relax due to the elasticity of the PVA-KOH-BTO piezoelectric nanogenerator with respect to the releasing pressure of the water and this leads to the change in the electromagnetic field and polarizing energy which results in the flow of net charge (Qo) through the piezoelectric device. During the repeated application of water pressure and relaxation process, the net flow of charge in the device can be expressed as, $$Q_o = \int I(t)dt - \int I(t_o)dt_o \quad (3)$$

$$= \frac{\int \hat{x} \int \vec{S} d\vec{\sigma} dt - \int \hat{x} \int \vec{S}_o d\vec{\sigma}_o dt_o - \int \iiint \vec{H} \frac{\partial \vec{B}}{\partial t} dV dt - \int \iiint \vec{H}_o \frac{\partial \vec{B}_o}{\partial t_o} dV_o dt_o}{\vec{U}_o} \quad (4)$$

Here, '$W_T$' indicates the net work done owing to the water pressure, '$U_o$' denotes the generated average potential during the water flow and relaxation process of piezoelectric device on the turbine blade.

In addition to electromagnetic theory, in another embodiment of the invention, theoretical evidence of self-charging effect from integrated turbine blades with piezoelectric nanogenerators is investigated using Nernst theory. The self-charging mechanism due to the induced pressure at the turbine blades coated with piezoelectric nanogenerators is expressed by Nernst equation as follows, When no water flows, the state of device can be expressed as, $$\phi = \varphi_o - \frac{RT}{F} \ln \frac{M}{(1-M)} - \frac{P}{M} \quad (5)$$

When the water flows, the pressure induced on the nanogenerator and the change of state of pressure turbine blades integrated nanogenerator device can be expressed as, $$\phi = \varphi_o - \frac{RT}{F} \ln \frac{M^o}{(1-M^o)} - \frac{P^o}{M^o} \quad (6)$$

Here, 'φ' and 'φo' represent the actual and standard potential of the nanogenerator device.

'R' is the gas constant,

'T' denotes the temperature,

'F' is the Faraday constant,

'M' represents the occupancy fraction of cations and anions at the inner and outer surface of the cathode and anode respectively of the nanogenerator.

'P' is the pressure generated due to the insertion and de-sertion of ions in to the pores of the electrodes.

'$M^o$' and '$P^o$' represent the change in occupancy fraction and intercalation/de-intercalation pressure of the generated ions when external force is applied.

Figure 4A:
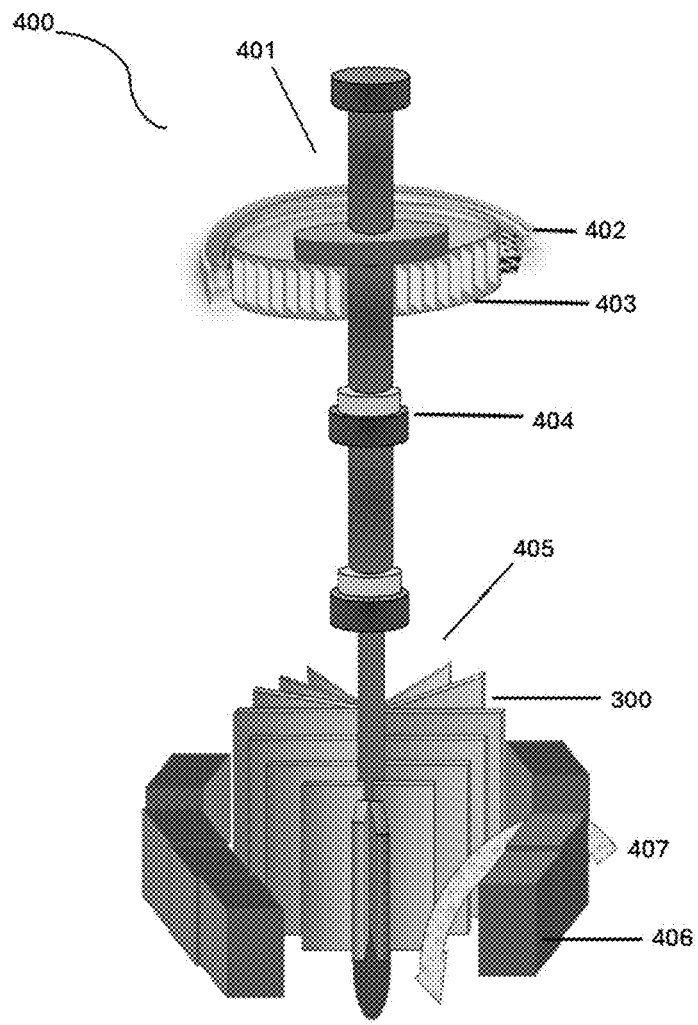
FIG. 4A and FIG. 4B show the schematic representation of integrated nanogenerator and turbine energy generation process, in accordance with the present invention.
Figure 4B:
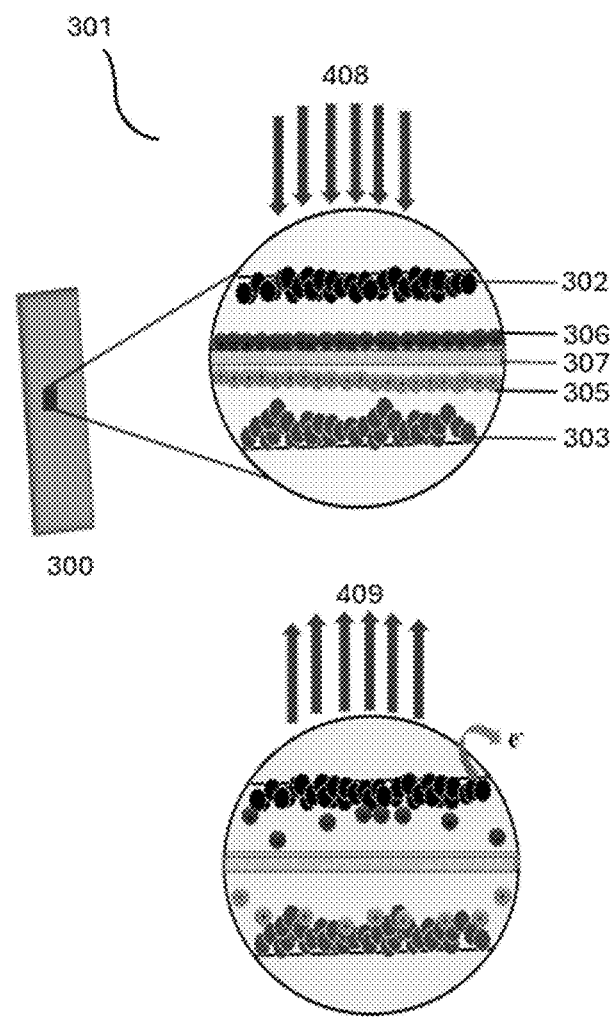

FIG. 4A and FIG. 4B together, illustrate the schematic representation of integrated nanogenerator and turbine energy generation process. FIG. 4A shows the nanogenerator integrated turbine (400). The generator (401) is composed of a stator (402), a rotor (403) and a shaft (404) that connects these elements to the turbine (405). The turbine itself features blades (300) and is surrounded by wicket gates (406) that regulate the waterflow (407) entering the turbine. FIG. 4B shows the energy generation process within a turbine blade (300) coated with the piezoelectric nanogenerator supercapacitor, also known as the SCHSC device (301). The force of the waterflow on the blade is depicted by water pressure IN (408) and water pressure OUT (409). When force is induced due to water flow at the turbine blades integrated with the nanogenerator device, polarization occurs in the PVA-KOH-BTO piezoelectrolyte (304) across both sides of a PVDF/ZnO nanogenerator separator (307). In this process, the positively charged ions/cations ($K^+$) (305) and negatively charged ions/anions ($OH^-$) (306) migrate towards the AC cathode (303) and anode (302) respectively. This migration alters the occupancy fraction of the electrodes ($M^o$>M), resulting in a potential difference between the electrodes and hence the self-charging process occurs.

In an embodiment of the present invention, the working of piezoelectric nanogenerators integrated with giant turbines in hydropower generation together cum mechanical energy from the flowing water to generate electricity is analyzed in detail and the power generated by the giant turbines is calculated. The integration of piezoelectric nanogenerator involves strategically placing the nanogenerators within or around the turbine structure to capture mechanical energy from the water flow. As water flows through the turbine, it induces mechanical vibrations and stresses on the turbine structure, which are transferred to the piezoelectric nanogenerators. These mechanical stresses applied to the piezoelectric material causes it to deform, resulting in the separation of positive and negative charges within the material-a phenomenon known as the piezoelectric effect. This generates an electric potential across the material. The electric charges produced are collected by electrodes connected to the piezoelectric material (charge collection). These charges flow through an external circuit, producing electrical current and hence the electricity generation. The electrical current generated by the piezoelectric nanogenerators adds to the overall power output of the hydropower system. This additional electricity supplements the power generated by the giant turbines. The integration of piezoelectric nanogenerators with giant turbines creates a synergistic effect (synergy), enhancing the overall energy harvesting efficiency of the hydropower system. The piezoelectric nanogenerators can capture energy even during low flow conditions when the turbines are not operating at full capacity, thereby maximizing energy production.

Power generated by the Giant Turbines: Hydropower generators with giant turbines operate with the flow of water based on the principle of converting the kinetic energy of flowing water into electrical energy. The water flow and head are the crucial factors which govern the total amount of power that can be generated from the turbines.

The output power produced from the hydroelectric power generation is calculated by Power (W)=Water Flow ($m^3$/s)×density of water (1000 kg/$m^3$)×Head/difference in elevation between the water source and turbine (m)× Gravity (9.81 m/$s^2$)×Efficiency (%)    (7)

Power generated by giant turbine integrated with Piezo-electric nanogenerators is calculated by $$P_{piezo} = 2 \frac{1}{1} \cdot C_p \cdot A \cdot \varepsilon_p \cdot (\Delta V)^2 \cdot f \tag{8}$$

Where:
Ppiezo—the power generated by the piezoelectric nanogenerator (in watts).
Cp—the capacitance of the piezoelectric material (in farads).
A—the effective area of the piezoelectric material (in $m^2$).
ep—the piezoelectric coefficient (in coulombs per newton).
ΔV—the voltage output (in volts).
f—the frequency of the mechanical vibrations (in hertz).

Figure 5:
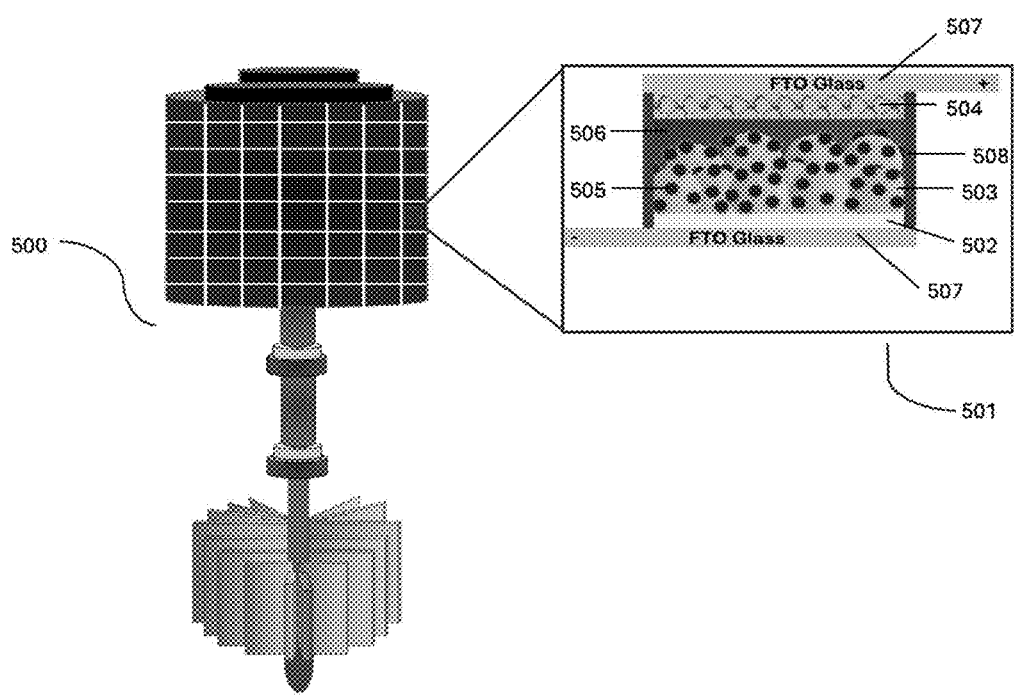
FIG. 5 shows the schematic representation of turbine generator coated with solar cells, as disclosed herein.

In another embodiment of the present invention, the working of solar cells integrated with giant turbines in hydropower generation together cum light energy and energy from the flowing water to generate electricity is analyzed. The integration of solar cells involves installing solar panels directly onto the surface of hydroelectric generator. These panels are strategically coated on the generator's surface to capture sunlight efficiently without interfering with the operation of the turbines. The solar panels are designed for efficiency and long-withstanding. The solar panels utilized in this integration are high-efficiency photovoltaic cells, designed to convert sunlight into electricity with minimal losses. They are built to endure harsh environmental conditions, such as exposure to water, wind, and temperature variations, ensuring long-term durability and performance. FIG. 5 represents the schematic representation of turbine generator coated with solar cells (500). In an embodiment of the system, the solar cell is a dye-sensitized solar cell or DSSC (501), integrated with the surface of the giant turbines. The DSSC comprises a compact $TiO_2$ layer (502), a mesoporous $TiO_2$ layer (503), a 2-D TMD counter electrode (504), dye (505), an electrolyte (506), Fluorine-doped Tin Oxide (FTO) glass (507), and a spacer (508). The dye in an embodiment, is an iodine-based dye.

Sunlight passes through the FTO glass (507) and the compact $TiO_2$ layer (502), reaching the mesoporous $TiO_2$ layer (503) where the dye molecules (505) are embedded. The compact $TiO_2$ layer (502) acts as a photoanode, allowing the light to pass through it and initiating the energy harvesting process. The mesoporous $TiO_2$ layer (503) then converts the light into electrons with the help of iodine-based dye molecules (505) surrounded by it. The dye molecules absorb photons and generate electron-hole pairs. Mesoporous $TiO_2$ utilized in the device provides a large surface area allowing for more dye molecules to be adsorbed onto the $TiO_2$ surface and an improved charge transport. In an embodiment, the 2-D TMD is $MoS_2$. The 2D $MoS_2$ (504) acts as a counter electrode that supplies the electron to form the electron-hole recombination process.

In an embodiment, the electrical integration in a turbine generator coated with solar cells involves the electricity generated by the solar panels being seamlessly integrated into the existing hydroelectric power generation system. It is fed into the grid alongside the power produced by the turbines, contributing to the overall energy output of the facility.

The photo-conversion efficiency ($\eta_{conversion}$) is calculated by the relation, $$\eta_{conversion} = \frac{FF V_{oc} J_{sc}}{E_i} \tag{9}$$

Where, $E_i$ is the incident light power density, $J_{sc}$ is the short circuit current density ($J_{sc}$), $V_{oc}$ is the open circuit voltage, and FF is the fill factor (FF) of the solar cell.

Figure 6:
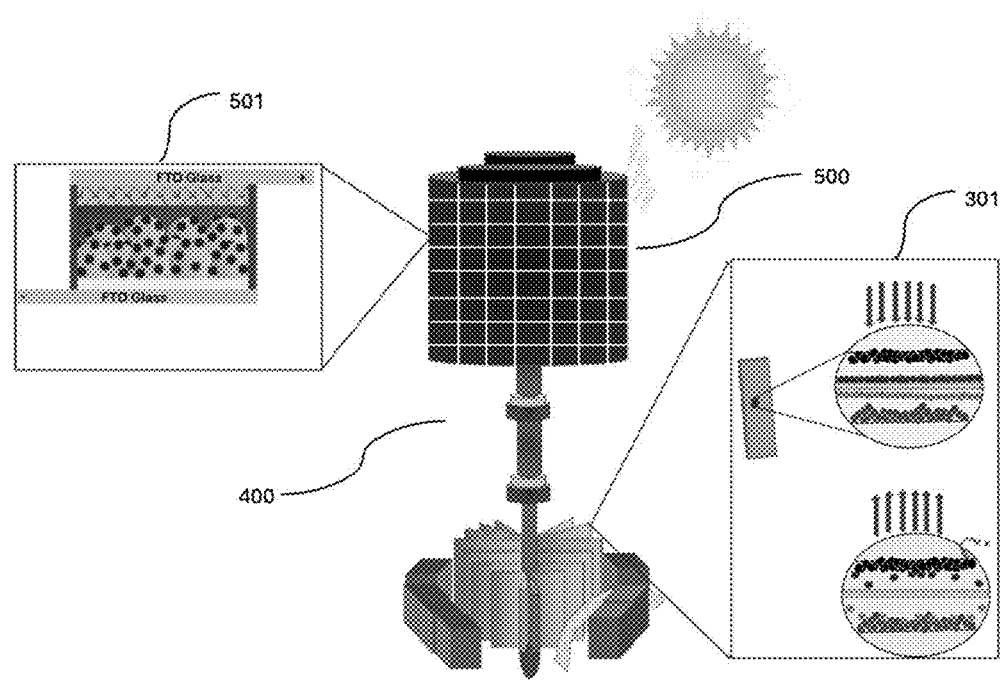
FIG. 6 shows the total energy generation using giant hydroelectric turbine integrated with piezoelectric nanogenerators and solar cells, in accordance with disclosed invention.

In an embodiment of the system, the integrated system comprises the giant hydroelectric turbine integrated with piezoelectric nanogenerators and solar cells and FIG. 6 illustrates the total energy generation using the said integrated system. The total power output of the integrated system can be calculated by summing up the power generated by the turbine, the power generated by the piezoelectric nanogenerators and the power generated by solar cells:

$$P_{total} = P_{turbine} + P_{piezo} + P_{solar} \tag{10}$$

This integration can enhance the overall energy harvesting efficiency and can be optimized by considering the design parameters of both the turbine and the piezoelectric nanogenerators as shown in FIG. 6.

The invention offers several advantages through the integration of solar cells and piezoelectric nanogenerators into the design of giant hydroturbines. The system harnesses two distinct renewable energy sources: solar energy and mechanical energy from water flow. This dual-source approach ensures continuous energy generation, regardless of environmental conditions, such as sunlight availability or water flow variations. Another advantage is its efficiency and adaptability in low-flow environments. PVA-KOH-BTO piezoelectric and $TiO_2$ solar cells integrated turbines can generate electricity even in low-flow water environments, where traditional hydroelectric turbines may not be as effective. Unlike conventional hydroelectric turbines that require significant water flow to generate electricity efficiently, the integrated turbines can operate effectively in low-flow environments and areas with minimal sun exposure. This adaptability expands the potential locations for hydropower generation, including small rivers and streams that may not support traditional hydroelectric projects.

Additionally, these turbines are designed with a focus on environmental sensitivity and on minimizing environmental impact. Unlike large dam construction for conventional hydroelectric projects, these turbines have minimal ecological disruption. They can be installed in rivers without significantly altering the natural flow or habitat. By harnessing the power of flowing water without the need for large dams or reservoirs, they preserve natural river ecosystems and minimize disruption to aquatic habitats. This environmental sensitivity makes them suitable for installation in environmentally sensitive areas or regions with strict conservation regulations.

Further, the invention presents modularity in design and scalability. The modular design of the piezoelectric and solar panel-integrated turbines allows for scalability and customization based on specific energy needs and location characteristics. It can be combined with existing infrastructure without requiring any new or separate installations. They can be deployed individually or as part of larger arrays, providing flexibility in project development and optimization of energy output. These integrated turbines can be designed and scaled to suit various water flow conditions and energy requirements, making them adaptable to different locations and energy needs.

The system also contributes to continuous power generation and exhibits integration potential. Hydropower offers consistent and reliable electricity generation, and these integrated turbines capitalize on this inherent reliability. They provide a steady source of clean energy that can serve as a baseload power supply or complement other renewable energy sources in hybrid energy systems. Furthermore, these turbines can be integrated into existing infrastructure or combined with other renewable energy sources to create hybrid energy systems. This enhances the overall energy generation efficiency and promotes the development of hybrid energy systems.

The upfront costs of designing, manufacturing, and installing piezoelectric-integrated turbines with solar panel coatings are minimal compared to the long-term cost savings due to enhanced energy efficiency and economies of scale. Regular maintenance of the system can further optimize its operation. Ongoing research and development of high-quality piezoelectric materials and dyes for solar cells are expected to improve the system's efficiency and cost-effectiveness. Moreover, suitable site selection, structural and design optimization, and effective intergration can ensure that installations are tailored to achieve maximum efficiency. In an advanced embodiment of the invention, integrating the system with robust monitoring systems and adaptive maintenance strategies ensures consistent energy generation, promising significant future prospective.

In conclusion, integrating solar cells and piezoelectric nanogenerators with giant hydropower turbines presents a multifaceted approach to enhancing renewable energy systems. This integration significantly boosts energy output by capturing solar power and mechanical vibrations in addition to the energy generated from water flow. The combined use of these technologies maximizes efficiency by utilizing solar energy during daylight and converting mechanical vibrations from turbine operations into electrical energy. Leveraging existing infrastructure, this hybrid system becomes a cost-effective solution by reducing the need for separate installations and minimizing operational costs. Environmentally, it reduces dependence on fossil fuels and lowers the ecological footprint by optimizing land use and harnessing diverse renewable resources. The approach also improves grid stability, providing a more consistent power supply by balancing the intermittent nature of solar energy with the steady output of hydropower. Additionally, the excess energy generated can be stored for use during peak demand or low generation periods, enhancing energy availability and reliability.

This integration fosters technological innovation, driving advancements in renewable energy and stimulating economic growth through job creation and investment in green technologies. Overall, it represents a strategic step towards a more resilient, efficient, and sustainable energy future. The development of piezoelectric and solar cell-integrated turbines also promotes ongoing research and innovation in materials science, turbine design, and renewable energy technology. Advancements in piezoelectric materials, structural engineering, and system integration continually enhance the performance, reliability, and cost-effectiveness of these turbines, driving further advancements in hydropower generation.

The proposed piezoelectric and solar cell integrated giant turbine holds significant potential for various real-time applications. It can be efficiently tested and implemented for: future hydropower and solar energy storage solutions; generation and supplementation of free energy under all climatic conditions; production of high voltage and high current outputs and providing supplementary electricity for both households and industries.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A hybrid system for efficient free-energy generation from multiple renewable sources, comprising:
    a giant turbine, positioned within a water flow, configured to convert kinetic energy from the water flow into electrical energy;
    a plurality of piezoelectric nanogenerators integrated with the turbine by embedding the plurality of piezoelectric nanogenerators to surfaces of blades of the giant turbine, configured to convert mechanical energy from the water flow into electrical energy; and
    a plurality of solar cells integrated with the turbine, configured to convert solar energy into electrical energy via a photo-electrochemical process, wherein the solar cells are mounted on top of or on the surface of the giant turbine, and are housed within a transparent shield to protect from environmental exposure,
    wherein
        the system combines and regulates electrical outputs from the turbine, the piezoelectric nanogenerators and the solar cells synergistically to provide a continuous and unified electrical output, regardless of real-time environmental conditions,
        the piezoelectric nanogenerators are self-charging hybrid supercapacitors (SCHSC) constructed by sandwiching an activated carbon (AC) cathode and an activated carbon anode, with porous cellulose filter paper as a separator, and
        the activated carbon used in the piezoelectric nanogenerators is derived from palm leaves, and is processed by soaking in aqueous KOH and washing with hydrochloric acid to achieve a neutral pH.

2. The system of claim 1, wherein the turbine comprises stator and rotor components, with a shaft and rotatory blades designed to maximize the conversion of kinetic energy from the water flow into electrical energy.

3. The system of claim 2, wherein the turbine is positioned in the water flow having a flow velocity to induce torque to rotate the turbine blades.

4. The system of claim 3, wherein the piezoelectric nanogenerators are integrated within or around the turbine structure to capture mechanical energy from water flow.

5. The system of claim 4, wherein the piezoelectric nanogenerators convert mechanical stress and vibrations of the turbine due to flow of water into electrical energy via piezoelectric effect.

6. The system of claim 5, wherein the piezoelectric nanogenerators further comprise a PVA-KOH-BaTiO$_3$ (PVA-KOH-BTO) piezo-electrolyte added between the cathode and anode, wherein the PVA-KOH-BaTiO$_3$ piezo-electrolyte is prepared by dissolving polyvinyl alcohol and KOH in distilled water to form a solution, and heating the solution and mixing in BaTiO$_3$ to form the PVA-KOH-BaTiO$_3$ piezo-electrolyte.

7. The system of claim 6, wherein the solar cells are dye-sensitized solar cells (DSSCs) comprising TiO$_2$ as a photoanode, a transition metal dichalcogenides (TMD) as a counter electrode, an iodine-based electrolyte and a dye comprising N719, for an enhanced performance and energy conversion efficiency, via a photo-electrochemical process.

8. The system of claim 7, wherein mesoporous TiO$_2$ as the photoanode exhibits high quantum efficiency, converting light into electrons with help of an iodine-based dye.

9. The system of claim 8, wherein the TMD is a molybdenum disulfide ($MoS_2$) as a counter electrode, facilitating effective charge separation and rapid electron transfer across electrode/electrolyte interfaces.

10. The system of claim 9, wherein the solar cells are positioned on a surface of the turbine to maximize sunlight exposure without interfering with the turbine operation.

11. The system of claim 10, wherein the system is configured to generate electricity efficiently and optimize the energy output based on the real-time environmental conditions comprising low flow conditions, minimum sunlight or the turbine is not operating at full capacity.

12. The system of claim 11, wherein the piezoelectric nanogenerators are designed to operate independently of the turbine rotation, capturing energy during low flow conditions.

13. The system of claim 12, wherein the system leverages existing infrastructure by integrating it with the piezoelectric nanogenerators and the solar cells, thereby reducing need for new installations and causing minimal ecological disruption, and wherein the system further comprises a monitoring system and adaptive maintenance strategy to ensure consistent energy generation and optimize system operation over time.

14. A hybrid method for efficient free-energy generation from multiple renewable sources, comprising:
    positioning a giant turbine within a water flow to convert kinetic energy from the water flow into electrical energy;
    integrating a plurality of piezoelectric nanogenerators with the turbine by embedding the plurality of piezoelectric nanogenerators to surfaces of blades of the giant turbine, wherein the piezoelectric nanogenerators convert mechanical energy transferred from the water flow to the turbine, to electrical energy via piezoelectric effect;
    integrating a plurality of solar cells with the turbine, wherein the solar cells convert solar energy into electrical energy via a photo-chemical process; and
    combining and regulating synergistically electrical outputs from the turbine, the piezoelectric nanogenerators and the solar cells to provide a continuous and unified electrical output, regardless of real-time environmental conditions,
    wherein
        the piezoelectric nanogenerators are self-charging hybrid supercapacitors (SCHSC) constructed by sandwiching an activated carbon (AC) cathode and an activated carbon anode, with porous cellulose filter paper as a separator, and
        the activated carbon used in the piezoelectric nanogenerators is derived from palm leaves, and is processed by soaking in aqueous KOH and washing with hydrochloric acid to achieve a neutral pH.

15. The method of claim 14, further comprising integrating the piezoelectric nanogenerators within or around the turbine structure wherein, the piezoelectric nanogenerators further comprise a $PVA-KOH-BaTiO_3$ (PVA-KOH-BTO) piezo-electrolyte, wherein the $PVA-KOH-BaTiO_3$ piezo-electrolyte is prepared by dissolving polyvinyl alcohol and KOH in distilled water to form a solution, and heating the solution and mixing in $BaTiO_3$ to form the $PVA-KOH-BaTiO_3$ piezo-electrolyte.

16. The method of claim 15, further comprising positioning the solar cells on a surface of the turbine to maximize sunlight exposure without disrupting the turbine operation wherein, the solar cells are dye-sensitized solar cells (DSSCs) comprising $TiO_2$ as a photoanode, a transition metal dichalcogenides (TMD) as a counter electrode, an iodine-based electrolyte and a dye comprising N719.

17. The method of claim 16, wherein mesoporous $TiO_2$ as the photoanode exhibits high quantum efficiency, converting light into electrons with help of an iodine-based dye and wherein, the TMD is a molybdenum disulfide ($MoS_2$) as a counter electrode, facilitating effective charge separation and rapid electron transfer across electrode/electrolyte interfaces.

18. The method of claim 17, wherein the method generates electricity efficiently and dynamically optimizes the energy output based on the real-time environmental conditions comprising low flow conditions, minimum sunlight or the turbine is not operating at full capacity.

19. The method of claim 18, further comprises operating the piezoelectric nanogenerators independently of the turbine rotation to capture energy during low flow conditions.

20. The method of claim 19, wherein the method leverages existing infrastructure by integrating it with the piezoelectric nanogenerators and the solar cells, thereby reducing need for new installations and causing minimal ecological disruption.

* * * * *